United States Patent
Tikekar et al.

(10) Patent No.: US 6,665,708 B1
(45) Date of Patent: Dec. 16, 2003

(54) COARSE GRAINED DETERMINATION OF DATA DEPENDENCE BETWEEN PARALLEL EXECUTED JOBS IN AN INFORMATION PROCESSING SYSTEM

(75) Inventors: Nikhil Tikekar, Pune (IN); Per Anders Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/438,320

(22) Filed: Nov. 12, 1999

(51) Int. Cl.[7] .......................... G06F 15/16; G06F 13/00
(52) U.S. Cl. ...................... 709/215; 711/150; 711/173
(58) Field of Search ........................... 709/1, 100, 107, 709/212–216, 312; 711/129, 148, 165, 147, 150, 153, 170, 173, 157

(56) References Cited

U.S. PATENT DOCUMENTS

| | | | |
|---|---|---|---|
| 4,044,337 A | * 8/1977 | Hicks et al. ................. | 714/16 |
| 4,224,664 A | 9/1980 | Trinchieri | |
| 4,760,519 A | * 7/1988 | Papworth et al. ........... | 712/217 |
| 5,073,855 A | * 12/1991 | Staplin et al. .............. | 712/217 |
| 5,408,629 A | 4/1995 | Tsuchiva et al. | |
| 5,559,992 A | * 9/1996 | Stutz et al. ................. | 48/190 |
| 5,748,934 A | 5/1998 | Lesartre et al. | |
| 5,751,983 A | 5/1998 | Abramson et al. | |
| 5,751,995 A | 5/1998 | Sarangdhar | |
| 5,754,812 A | 5/1998 | Favor et al. | |

(List continued on next page.)

FOREIGN PATENT DOCUMENTS

EP       0117930 A1    9/1984

OTHER PUBLICATIONS

Per Holmberg, et al., "APZ 212 30 —Ericsson's New High–Capacity AXE Central Processor," Ericsson Review No. 3, 1999, pp. 148–155.

K. A. Duke et al., "Multiprocessing Storage Conflict Resolution Technique", IBM Technical Disclosure Bulletin, vol. 15, No. 10, Mar. 1973, pp. 3232–3233.

Rashid et al., "Machine Independent Virtual Memory Management for Paged Uniprocessor and Multiprocessor Architectures", IEEE Transactions on Computers, pp. 896–907, 1988.*

Halstead, Jr. et al., "MASA: A Multithreaded Processor Architecture for Parallel Symbolic Computing", IEEE Conference Proceedings 15th Annual International Symposium on Computer Architecture, 1988.*

Chase et al., "Sharing and protection in a single–address–space operating system", ACM Transactions on computer Systems (TOCS), Nov. 1994, pp. 271–307.*

Chase, et al., "Lightweight shared objects in a 64–bit operating system", Conference on Object Oriented Programming Systems Languages and Application, Vancouver, British Columbia, Canada, pp. 397–413, 1992.*

Moore, Simon W., "Multithreaded Processor Design", Klumer Academic Publishers, Copyright 1996, pp. 57–65.*

*Primary Examiner*—Mark R. Powell
*Assistant Examiner*—Marc D. Thompson

(57) ABSTRACT

A computer system performs a coarse-grained dependency checking between concurrently executed jobs that share a memory. First and second jobs are defined, each having a set of shared individually addressable data items stored in a corresponding set of locations within a memory. The set of locations are partitioned into a set of data areas, wherein at least one of the data areas stores more than one of the data items. The first and second jobs are then run. To determine whether a collision has occurred between the first job and the second job, it is determined whether the first job accessed a same data area as was accessed by the second job, regardless of whether a same data item within the same data area was accessed by both the first job and the second job.

30 Claims, 10 Drawing Sheets

U.S. PATENT DOCUMENTS

| | | | |
|---|---|---|---|
| 5,778,210 A | 7/1998 | Henstrom et al. | |
| 5,781,752 A | 7/1998 | Moshovos et al. | |
| 5,797,025 A | 8/1998 | Popescu et al. | |
| 5,812,811 A | 9/1998 | Dubey et al. | |
| 5,838,940 A | 11/1998 | Savkar et al. | |
| 5,838,941 A | 11/1998 | Valentine et al. | |
| 5,875,464 A * | 2/1999 | Kirk | 711/173 |
| 5,887,161 A | 3/1999 | Cheong et al. | |
| 5,974,536 A * | 10/1999 | Richardson | 711/150 |
| 6,167,437 A * | 12/2000 | Stevens et al. | 709/214 |
| 6,182,108 B1 * | 1/2001 | Williams et al. | 709/102 |
| 6,243,793 B1 * | 6/2001 | Aucsmith et al. | 711/151 |
| 6,345,351 B1 * | 2/2002 | Holmberg | 711/147 |

* cited by examiner

COARSE GRAINED DETERMINATION OF DATA DEPENDENCE BETWEEN PARALLEL EXECUTED JOBS IN AN INFORMATION PROCESSING SYSTEM

BACKGROUND

The present invention relates to information processing system organizations, more particularly to the parallel execution of computer programs or jobs, and even more particularly to techniques for enabling the speculative execution of concurrent jobs in an information processing system.

The traditional electronic computer has a single processing unit, and operates in accordance with a model whereby program instructions are retrieved ("fetched") one-by-one from an addressable memory, and then executed. Instructions that are to be executed in sequence are typically stored at sequential address locations within the memory. Exceptions to this sequential storage of instructions often occur, as for example when execution of a program segment is made conditional on some condition to be tested (e.g., whether two values are equal to one another), or when execution of the present program segment is to be interrupted by execution of another program segment (e.g., in response to a subroutine call or an interrupt). In such cases, program execution may take what is called a "branch" or "jump" to another location, whereby the fetching of instructions continues not with the next sequentially stored instruction, but with one stored at some other location within the memory.

Regardless of how the instructions are stored, it is the expectation of the programmer that the instructions that constitute a particular job will be executed in a particular order. A consequence of this expectation is that variables will be operated upon (e.g., modified or tested) in a particular sequence. Failure to comply with this expectation can result in a job that generates error-laden results.

It continues to be a goal of computer architects to design systems that can complete more work in less time. One approach for doing this has concentrated on making processing elements that are capable of operating faster. This approach has no impact on the programmer's expectation of sequential program execution.

Another approach to improving processing speed has been to devise processors that are capable of operating concurrently. For example, in a so-called "super-scalar" processor, the elements within a single processor are organized in such a way so as to permit several instructions to be performed concurrently. Another way to provide concurrent execution of instructions (so called "instruction level parallel" (ILP) processing) is to provide multiple processing units, each attached to a shared memory, and to allocate individual instructions of a single program to be run on different ones of the processing units.

In order to ensure that the programmer's expectation of sequential program execution is carried out, these architectures need to deal with two types of dependencies: "control dependency" and "data dependency". Control dependency refers to the dependency of instructions to be executed only as a function of whether a conditional branch or jump has been taken in a preceding instruction. Data dependency is a dependency of instructions that use data that is created or changed by earlier instructions. The later-specified instructions may correctly execute only if the earlier instructions using the same data do not change the common data or have completed the change of the common data.

Rather than holding up the execution of an instruction whose execution is in some way dependent on the results generated by another instruction, these architectures often turn to the speculative execution of an instruction. That is, an instruction is executed as if there were no control or data dependency. The results of such a speculatively executed instructions must be undone in the event that it is later discovered that the originally planned sequential execution of the instructions would have achieved different results. U.S. Pat. No. 5,781,752 describes an ILP architecture that employs a table based data speculation circuit.

In yet another approach to increasing overall processing speed, some computer systems achieve high processing performance through a computer architecture known as Symmetric Multi Processing (SMP). In contrast to the fine-grained parallelism achieved by the above-described ILP architectures, the SMP architecture exploits coarse-grained parallelism that is either explicitly specified in programs designed in accordance with concurrent programming principles, or extracted from programs designed for sequential execution on a single-processor system during compilation.

Coarse-grained parallelism means task-level parallelism as opposed to instruction-level parallelism (although the two types of parallelism are not mutually exclusive—different tasks could be assigned to separate processors which each then employ instruction-level parallelism to carry out their respective task). In an SMP architecture, each one of several rather self-contained and complex computing tasks is carried out on a respective one of several processors. These tasks are mutually concurrent processes, threads or other similar constructs well-known in the information processing arts.

In another computer architecture having multiple processors, further parallelism is extracted during program execution by creating different threads from a single program, and assigning several tasks to different processors for concurrent execution. Because they derive from the same program, these threads may have dependencies similar to those described above with respect to instruction level parallelism. In particular, it is important that the two or more threads maintain data consistency—that is, that a thread intended for later execution not use a data variable that has yet to be updated by a thread intended for earlier execution, and that the thread intended for later execution not modify a data variable that will subsequently be accessed by a thread intended for earlier execution. The occurrence of either of these events is called a "collision".

Because of the possibility of collisions, it is common to insert locks (semaphores) into the code in order to maintain data consistency. This prevents any collisions from happening. However, algorithms that extract parallelism and insert locks for this purpose must employ a very conservative strategy because they must guarantee that a collision never occurs. This has the drawback of limiting the amount of parallelism that can be extracted.

As another solution to the problem presented when threads that share a data memory space are concurrently executed, one may employ speculative execution. In speculative execution, a collision between threads is detected and the erroneous results of executed threads are undone or purged and threads are restarted in such a way as to guarantee progress (i.e., to guarantee that at least one of the restarted jobs will complete without a collision).

In one architecture, one of a number of parallel threads is designated as a "committed thread". All other concurrently executed threads are referred to as "speculative threads".

The committed thread is a thread that would be executed earliest if execution were sequential. The committed thread stores its state directly in a main memory. (As used herein, the term "state" refers to the execution results of a thread or job, such as memory updates, heap, stack, signaling and so forth.) Speculative threads however temporarily store their states not in the shared memory, but in a memory (or memory area) distinct from the shared memory.

Since the committed thread is the thread intended for the earliest execution if execution were sequential, and since the results of the execution of the speculative threads do not affect the shared memory, there is no question concerning accuracy of the result of the committed thread. When execution of the committed thread is complete, it is simply retired. No particular action is taken with regard to the memory because an accurate state of the committed thread is already part of the shared memory.

After retirement of the committed thread, another thread is designated as a new committed thread. Designating a thread as a new committed thread is called "committing a thread". The order in which threads are committed is always maintained the same as the order in which threads would be executed if they were executed sequentially. Committing a thread is done provided that no collision is detected for the thread. When committing a thread that is speculatively executing (or has been speculatively executed), the temporarily stored memory states are copied to the shared memory.

If a speculative thread encounters a collision, the collision is resolved by purging the temporarily stored states of at least one or more speculatively executed threads, and executing them anew. Purging the temporarily stored states is also referred to as a "roll-back" or "flush".

Speculative execution in conjunction with detecting collisions, and rolling back state changes when necessary offers a high potential for extracting parallelism from a program. Good performance is achieved so long as collisions do not occur too often (i.e., so long as the overhead associated with performing roll-backs is not excessive).

The "Program Language for EXchanges" (PLEX) programming-model by Telefonaktiebolaget LM Ericsson employs essentially non-preemptive scheduling. Each PLEX program is divided into multiple jobs. A job is the execution of a sequential program that is initiated by a scheduler in response to an event, and that uninterruptedly continues until it finishes without external intervention. An event may result from an externally generated request (such as by a telephony subscriber) or it may result from a request generated by another job. Several jobs are generally queued in the scheduler, and carried out in a first-come-first-served manner.

PLEX lends itself well to parallel processing. Jobs are simply scheduled on multiple processors by a scheduler. However, when PLEX programs that are designed for execution on a single processor are executed on multiple processors in parallel, dependencies may emerge because jobs operate on a shared memory.

According to another concept developed at Telefonaktiebolaget LM Ericsson, called "Job Parallel Computer" (JPC), dependencies between jobs executed in parallel are resolved through speculative execution. In JPC, one and only one job at a time is committed. States of the committed job are effectuated immediately in the shared memory during execution. If there is no dependency when execution of the committed job finishes, a speculatively executed job becomes committed as determined by the scheduler. States generated by the speculatively executed job being committed take effect in the shared memory only after the previously committed job finishes execution and the speculatively executed job becomes the new committed job.

In the event of a dependency, speculatively executed jobs are flushed and execution of the speculatively executed jobs is repeated. A strict scheduling order is always maintained.

Dedicated hardware is used for managing coarse-grained parallelism with speculative execution. The dedicated hardware includes a memory area for temporarily storing information from speculative execution of threads or jobs. When it is time to commit a speculatively executed job, the information is copied from the temporary storage area into the shared memory. The dedicated hardware further includes logic for dependency checking.

The existing approaches to enabling coarse-grained parallelism with speculative execution generally require dedicated hardware support in order to be efficient. However, it would be desirable to be able to benefit from the full potential of computer architectures implemented with standard processors. In particular, programs designed under the sequential programming paradigm have not previously benefitted from the coarse-grained parallel capabilities of a multiprocessor based computer that uses standard processors.

Moreover, even with dedicated hardware support, conventional techniques for implementing coarse-grained parallelism with speculative execution require quite a bit of resource and processing overhead in connection with dependency checking between the concurrently executed jobs. In particular, these techniques require the allocation of extra storage for every addressable data item that is shared by the concurrently executed jobs. This extra storage is used to keep track of which jobs have accessed the particular shared address, and what type of access was performed (i.e., read or write). In addition, a great deal of extra processing overhead is incurred by the need to perform a dependency check just prior to each and every attempt to access the shared memory. There is, therefore, a need for more efficient techniques for performing dependency checking between concurrently executed jobs that share a memory space.

SUMMARY

It is therefore an object of the present invention to provide a technique for enabling coarse-grained execution of concurrent jobs that does not require special support hardware to handle speculative execution of jobs.

In accordance with one aspect of the present invention, the foregoing and other objects are achieved in a computer that performs dependency checking between two or more concurrently executed jobs that share a memory space. In some embodiments, this involves defining a first job and a second job, each having a set of shared individually addressable data items stored in a corresponding set of locations within a memory. The set of locations are partitioned into a set of data areas, wherein at least one of the data areas stores more than one of the data items. The first job and the second job are then run. To determine whether a collision has occurred between the first job and the second job, it is determined whether the first job accessed a same data area as was accessed by the second job, regardless of whether a same data item within the same data area was accessed by both the first job and the second job. By checking for conflicting accesses to a data area rather than to individual data items, the overhead associated with dependency checking can be greatly reduced.

In another aspect, a set of marker fields is created, each uniquely associated with a corresponding one of the data areas. For each of the data areas, a first subfield (e.g., a bit) is set in the associated marker field in response to the first job accessing any of the data stored within the data area. Also, for each of the data areas, a second subfield is set in the associated marker field in response to the second job accessing any of the data stored within the data area. These flags can be used to determine the occurrences of collisions between the first and second jobs.

In one class of embodiments, determining whether a collision has occurred between the first job and the second job comprises determining whether there exists a marker field having both the first subfield and the second subfield set. In this way, collision checking can be performed after the first and second jobs have accessed the data area.

In another class of embodiments, the step of determining whether a collision has occurred between the first job and the second job comprises determining that the first job is attempting to access one of the data items stored in a first data area; and determining whether the second subfield in the marker field associated with the first data area is set. In this way, collision checking can be performed dynamically as the first job's access is being attempted, rather than waiting for both jobs to finish accessing the data area. This is particularly useful when a non-privatization strategy is adopted for maintaining speculative states.

In yet another aspect, for each of the data areas, setting a first subfield in the associated marker field in response to the first job accessing any of the data stored within the data area may be performed only in response to the first time the first job accesses any of the data stored within the data area.

In still another aspect, for each of the data areas, setting the first subfield in the associated marker field may be performed in response to a software trap instruction that is executed just prior to another program instruction that causes the first job to access one of the data items stored within the data area.

Alternatively, setting the first subfield in the associated marker field may be performed in response to a memory protect interrupt caused by the first job accessing any of the data items stored within the data area. In another aspect of this embodiment, a memory protect bit associated with the first job and the data area is reset after the first memory protect interrupt caused by the first job accessing any of the data items stored within the data area. This prevents further memory protect interrupts associated with this job and data area from reoccurring.

In another class of embodiments, at least one of the data areas is associated with a program block; and for said at least one of the data areas, the first subfield in the associated marker field is set in response to initiating program execution in the program block.

In yet another class of embodiments, at least one of the data areas is a page of the memory. In an alternative embodiment, at least one of the data areas is a data record defined by the first job and the second job, wherein the data record comprises a plurality of record variables. In yet another alternative embodiment, the first job and the second job are created by an object oriented programming language; and at least one of the data areas is a portion of the memory containing a method or an entire object that is part of the first job and the second job.

In another aspect, the step of determining whether the collision has occurred between the first job and the second job comprises determining whether the first job read from the same data area as was accessed by the second job, regardless of whether the same data item within the same data area was accessed by both the first job and the second job.

In still another aspect, determining whether the collision has occurred between the first job and the second job comprises determining whether the first job wrote to the same data area as was accessed by the second job, regardless of whether the same data item within the same data area was accessed by both the first job and the second job.

BRIEF DESCRIPTION OF THE DRAWINGS

The objects and advantages of the invention will be understood by reading the following detailed description in conjunction with the drawings in which.

DETAILED DESCRIPTION

Figure 1:
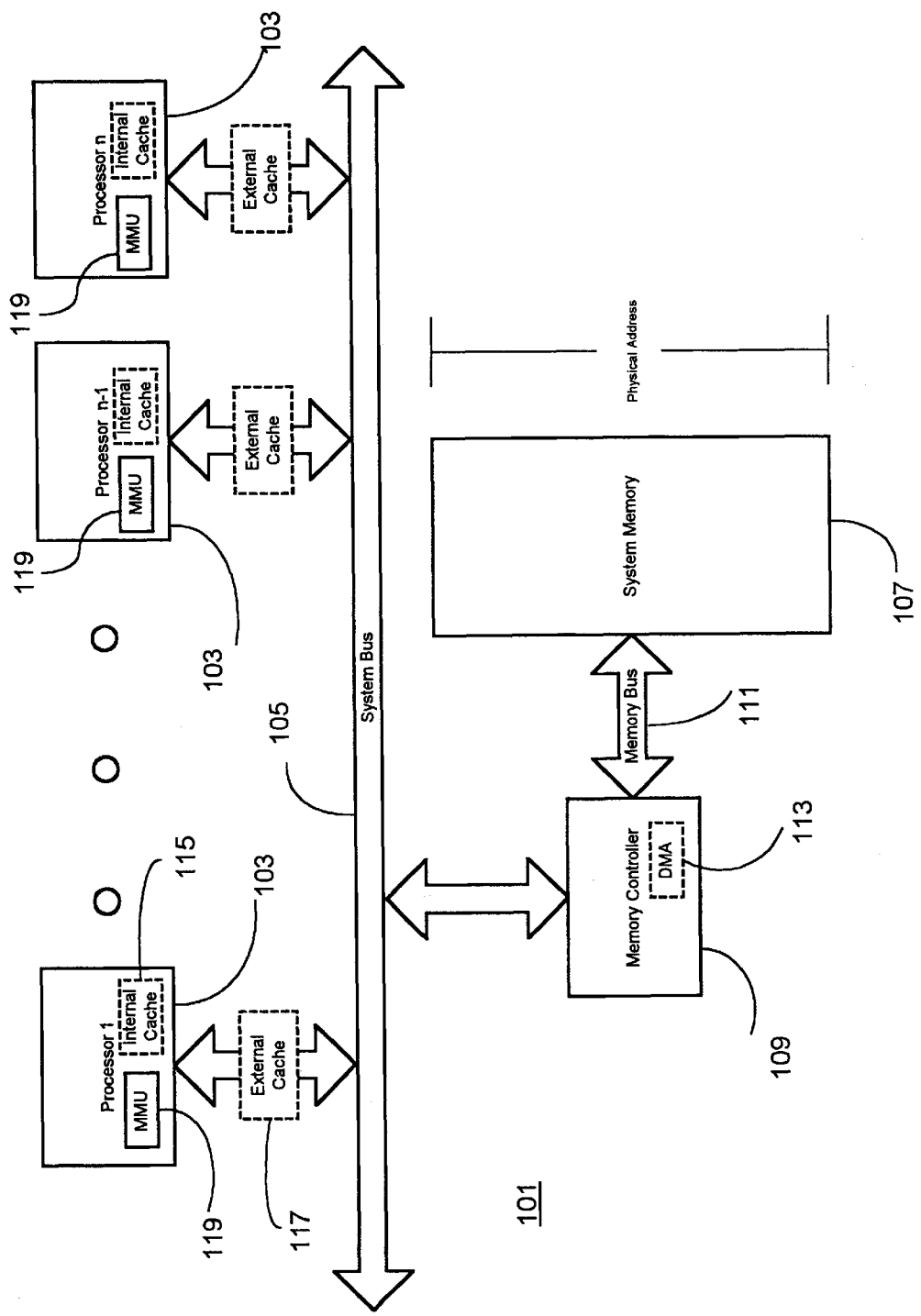
FIG. 1 is a block diagram of an exemplary multi-processing system that is suitable for implementing the various aspects of the invention.

The various features of the invention will now be described with respect to the figures, in which like parts are identified with the same reference characters.

Techniques will now be described that enable more efficient checking for the occurrence of collisions between concurrently executed jobs that share a memory. This is achieved by means of course grained dependency checking, in which two jobs are deemed to have collided if they have each accessed the same block or area of data, regardless of whether they have accessed the same or different locations within that same block. In one aspect of the invention, this is done by associating a "marker field" with each data area (where the term "data area" is used to refer to an area of storage larger than a single individual variable or data item). The marker indicates whether a particular job has accessed the associated data area. If the markers associated with two or more jobs indicate that they each accessed the same data area, then the collision is detected.

In various embodiments, the data area with which the marker field is associated may alternatively be defined physically (e.g., defined as a page of memory, managed by the memory management unit), logical (e.g., defined as records, objects, files, and/or tables in a program), or a combination of the two.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., memory management unit hardware), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

Referring first to FIG. 1, this is a block diagram of an exemplary multi-processing system 101 that is suitable for implementing the various aspects of the invention. The exemplary system 101 has a SMP architecture that includes one or more processors 103 that communicate with other system components via a bus 105. Although it is not required for practicing the invention, in exemplary embodiments each of the processors 103 has a super-scalar architecture, such as that of the Pentium-Pro™ processor offered by the Intel™ Corporation.

The system 101 is designed in accordance with any one of a number of well known standard platforms widely used in the computer industry. In the exemplary embodiment, the system 101 further includes, in addition to the processors 103, a system memory 107 and a memory controller 109. The system memory 107 and the memory controller 109 communicate with each other over a memory bus 111.

The memory controller 109 controls memory access to or from the system memory 107 by the microprocessor processors 103 over the memory bus 111. In response to read and write access requests generated by the processors 103, the memory controller 109 generates corresponding memory access cycles directed towards the addressed memory locations within the system memory 107. The memory controller 109 may also include a well known direct memory access (DMA) unit 113 (shown in dotted lines), a facility of some architectures which allows a peripheral to read and write to the system memory without intervention by the processors 103. Preferably, the system 101 also includes one or more internal or external cache memory units 115 and 117 (shown in dotted lines). The cache units 115 and 117 store a certain portion of the system memory 107 that is used more frequently by the processors 103. It should be noted that some multi-processor system architecture provide each processor with a dedicated cache memory, while others provide a shared cache memory unit for all of the processors.

The system memory 107, which is accessible to each processor 103, has a predefined physical memory address range. In order to access (i.e., read or write) any location within the system memory 107, it is therefore necessary to present a corresponding physical memory address to the system memory 107 by means of the memory bus 111. However, computer programs (e.g., operating system, application programs, emulation programs, etc.) running on any of the processors 103 do not use these physical addresses directly. Instead, each computer program sees a virtual address space that may or may not be the same size as that of the physical address space.

Because of the use of virtual addressing, it is necessary to translate each virtual memory address into a physical memory address whenever the system memory 107 is to be accessed. To facilitate this process, the virtual and physical address ranges are each divided into blocks of contiguous addresses. Each one of these blocks, which is also known as a "page", has a fixed number of consecutive memory addresses associated with it. Typically, each page has a size of $2^N$, where N is an integer. Thus, given a pointer to the start of a page (in either the virtual or physical memory space), an N-bit offset address may be used to access any location within the page.

Each page is, itself, associated with a unique page number that distinguishes it from all other pages. Assuming, then, that the number of pages in the memory (whether virtual or physical) is $2^M$, an address that uniquely identifies one memory location can be formed by concatenating the page number with the N-bit offset address described above to form an M+N bit address. As mentioned earlier, the size of the virtual memory space need not be equal to the size of the physical memory space. Consequently, the value of "M" need not be the same for a virtual address as it is for a physical address.

As mentioned earlier, the M+N bit virtual addresses used by the running programs need to be translated into physical addresses before they can be supplied to the system memory 107. To perform this function in the exemplary embodiment, each processor 103 is equipped with a memory management unit (MMU) 119 that treats the most significant M bits of each address as a page number, and the remaining N bits as an offset within the page. A page table (not shown in FIG. 1) located within the system memory 107 uniquely maps each of the $2^M$ virtual pages to a corresponding physical page in the system memory 107. When the MMU 119 performs logical to physical address translation for each memory read or write, it does so by performing a table look-up (also referred to as a "table walk"), locating the relevant page table entry, and then calculating the physical address. The traditional way to organize a page table is as a two- or three-level indexed look-up table, or as a hash table. To speed up page table look-up, special caches, called Translation Look-aside Buffers (TLBs) are introduced for holding the most-used translations. When a system includes TLBs, table look-up is needed only when the TLB fails to include a translation for a requested virtual page. This occurrence, which is referred to as a "TLB miss", typically causes an interrupt that not only performs the necessary table lookup, but also loads an appropriate entry in the TLB so that this translation can be more efficiently performed in the future.

Systems can be designed to perform table walk operations either in hardware or in software. The use of hardware-implemented table walks has the advantage of being slightly faster than software implementations. One disadvantage of hardware-implemented table walks is the added hardware complexity. Another disadvantage is reduced flexibility: when implemented in hardware, the table structure and the TLB miss handling in general are also determined by the hardware, and cannot be defined by the operating system being run on the hardware.

To implement table walks in software, program execution takes a trap in the processor, and performs a table walk in the trap handler. An advantage of this approach is reduced chip complexity (compared to hardware-implemented table walks). Furthermore, the table structure, as well as the handling in general, can be specified by the running operating system.

In addition to the above-described mapping information, each page table entry (PTE) also includes information that indicates whether (and possibly when) a virtual/physical page was accessed, as well as whether the virtual page should be cached or not.

The PTE may also contain memory protection flags. Memory protection is a mechanism that prevents one portion of a program from accidentally accessing the memory allocated to another portion of the program. One example is the allocation of an "own" protected memory space to each of a number of user processes. (A process is a sequentially executed program.) Read and write operations by one process to the memory allocated to another process are not permitted to occur. Any attempt to do so results in a so-called "trap exception." A trap is a software interrupt that transfers execution control from the program that performed the trap-causing instruction to another portion of the program ("trap handler"), which is typically part of the operating system. (An operating system is a special program that controls the execution of other programs on the underlying hardware.) The operating system then resolves the trap-related problem as fit. The use of the trap handler routine in connection with the invention will be described in greater detail later in this description.

Memory management is typically transparent to ordinary application programs. Consequently, a program's view of how its storage is laid out in virtual address space (virtual storage) need not match how that storage is arranged in the physical address space (physical storage). In particular, the system memory 107 may appear to the program as a sequence of consecutive memory addresses (in virtual storage), even though it may actually be mapped to a number of scattered (e.g., non-contiguous and/or out of sequence) physical memory pages within the system memory 107. This permits the underlying operating system to utilize memory allocation strategies that make most efficient use of the available physical memory.

It should be noted that the exemplary embodiment depicted in FIG. 1 is but one of many possible SMP architectures that may effectively be used for the invention. For example, various physical memory and cache structures may be used, both shared or distributed. These may be bus or switch interconnected. Furthermore, physical memory may be centralized, or distributed among the processors 103, possibly presenting different access times for different processors 103.

Figure 2:
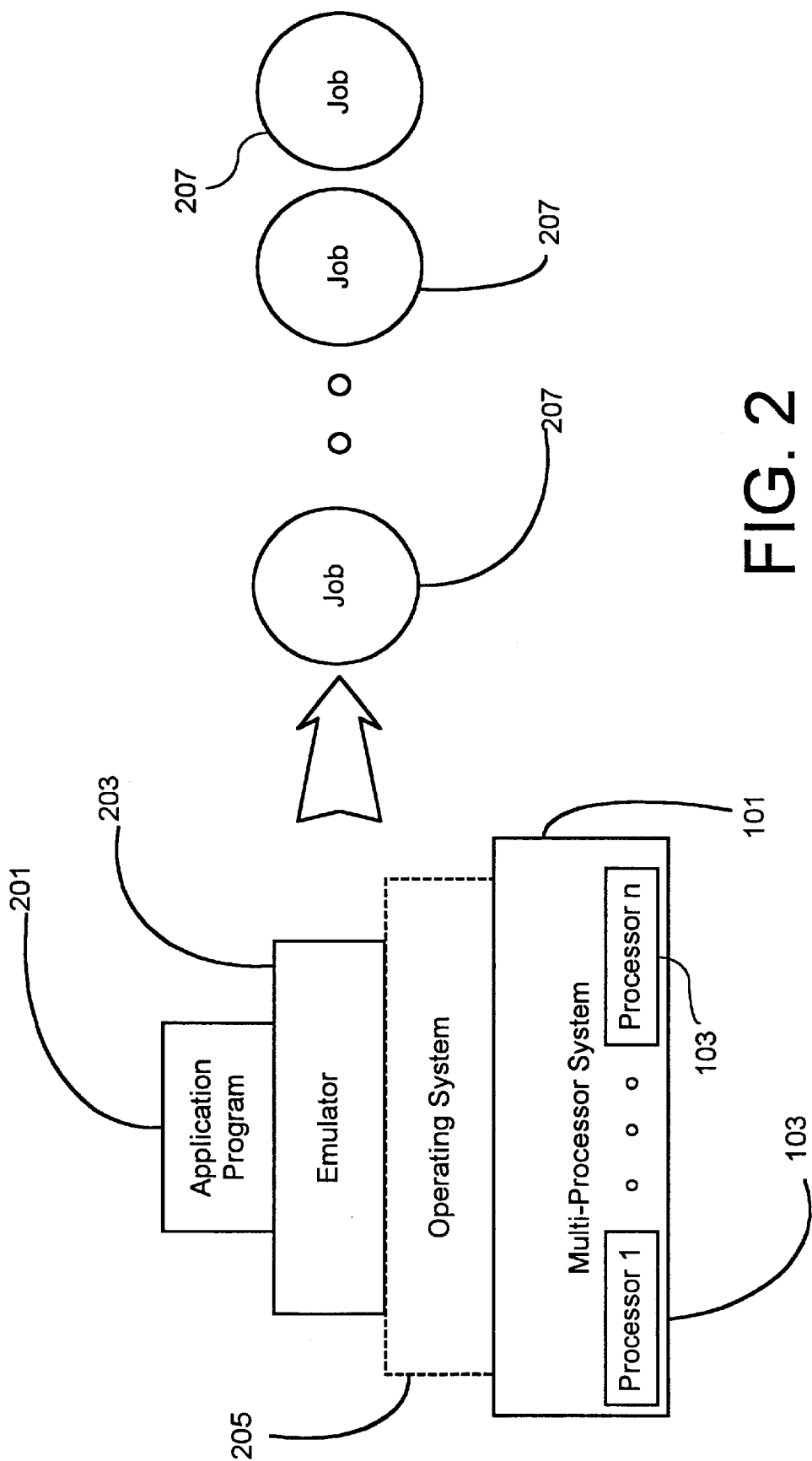
FIG. 2 is a block diagram of an exemplary arrangement of software for supporting concurrent execution of jobs that share a memory space.

The discussion has focused on the physical organization of the system 101. However, the software in the system should also be suitably arranged to support concurrent execution of jobs that share a memory space. One such arrangement is depicted in FIG. 2. The system 101 is controlled by a hierarchy of programs. At the top level is an application program 201. The application program 201 may, for example, be a so-called "legacy" program that was originally intended for execution in a single processor environment. Consequently, the application program 201 is not particularly adapted to handle the problems associated with concurrent execution of its constituent parts.

To provide this adaptation in this example, the application program 201 interfaces with an emulator program 203. Emulator programs are well-known in the art as programs that create a virtual machine that allows applications, originally written for another processor, to execute on an available, different processor either by interpreting the application code or by recompiling the application code. For example, a Java Virtual Machine (JVM) is an emulator that allows Java byte code to execute on almost any processor. Emulator programs may either directly interface with the underlying processing equipment, or may alternatively operate by means of interaction with an operating system 205 (shown in dotted lines in FIG. 2) that directly interacts with the underlying processing equipment.

In the present environment, the emulator program 203 (either alone, or acting in conjunction with the operating system 205) creates a virtual machine that allows the application program 201 to execute on the available multi-processor system 101. Here, one of the tasks of the emulator 203 is to transform the application program 201 into one or more jobs 207, each of which will be run on one of the processors 103 in the system 101. Separate jobs can be created for basic blocks in the application program 201, for individual iterations in a loop, for method calls in an object oriented program, or between tasks, or as a consequence of "events" in event-based systems. The particular approach taken in this regard is up to the designer, and is beyond the scope of this description.

The use of an emulator program 203 as depicted in FIG. 2 is but one way of generating and running parallel jobs 207 from an application program 201. In an alternative embodiment, one would forgo the use of the emulator 203 in favor of recompiling the source code for the application program 201. The compiler used in this instance would be one that generates object code for a plurality of jobs 207, each intended for concurrent execution with other jobs 207.

In another alternative, one might forgo the use of the emulator 203 in favor of an "instrumentation" process in which the object code for the application program 201 is modified by breaking it up into separate jobs 207, and adding suitable instructions that will support concurrent execution of the plurality of jobs 207.

In yet another alternative, the application program 201 might be written in the PLEX programming language. In this case, the code is already divided into threads or jobs 207, so the emulator 203 is unnecessary.

Regardless of the technique used for creating them, because the jobs 207 are generated from what was a single application program 201, it is likely that at least some of the jobs 207 will share a memory space. However, in order to run a number of concurrent jobs that share a memory space, support must be provided to maintain the integrity of the data. As explained in the BACKGROUND section, so-called "collisions" can occur whenever two or more jobs, originally intended for sequential execution on a shared memory space, are run concurrently. Such collisions can result in erroneous execution results if no steps are taken to resolve them.

Figure 3:
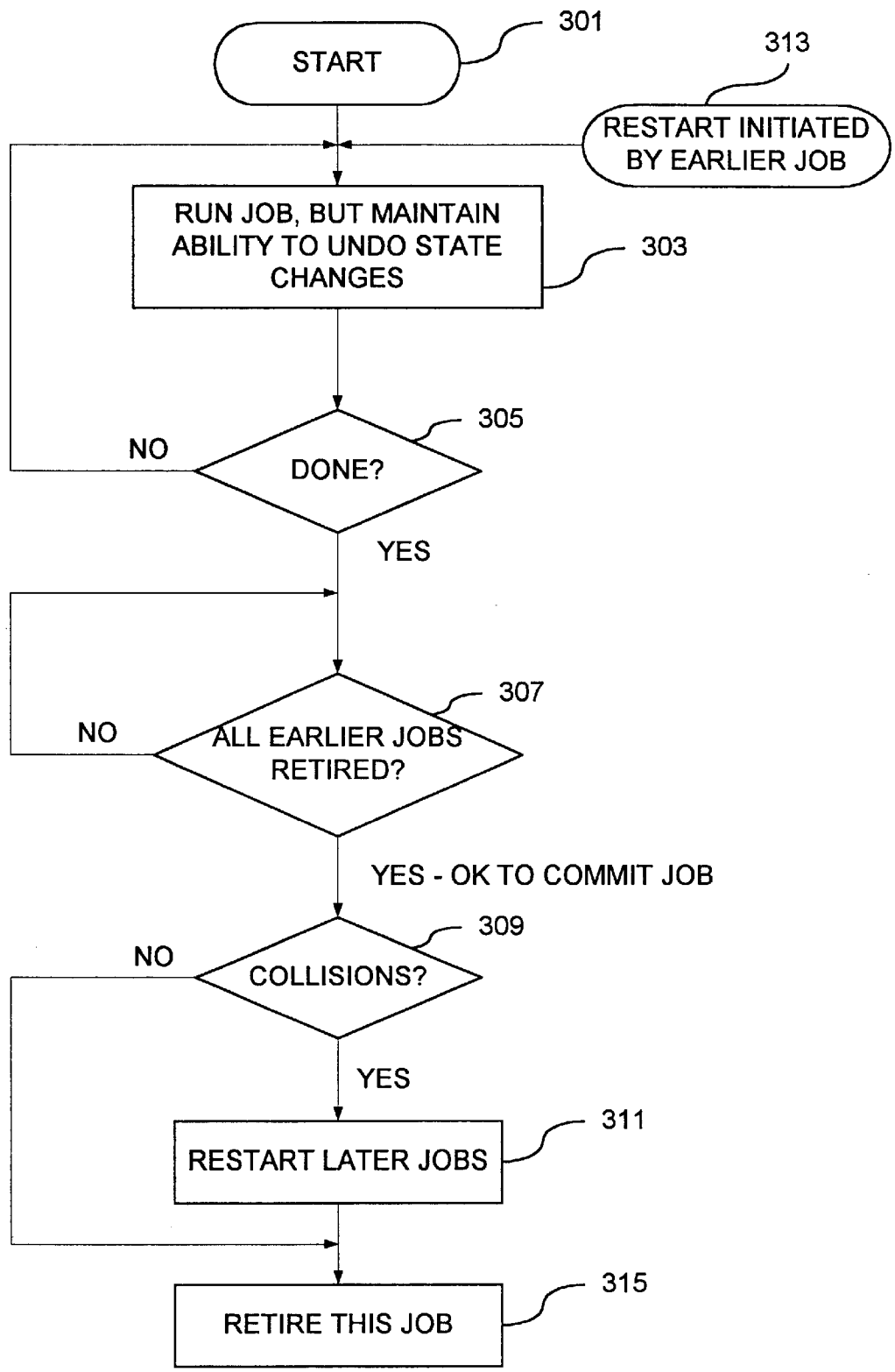
FIG. 3 is a flowchart depicting an overall strategy that may be adopted to concurrently run the jobs that share a memory space, in accordance with an aspect of the invention.

FIG. 3 is a flowchart depicting the overall strategy that is adopted to concurrently run the jobs 207 that share a memory space. Fundamental to the strategy is the notion that the jobs 207 can be arranged in an execution order that would guarantee valid results if the jobs 207 were to be executed one at a time. For example, when the jobs 207 are derived from a single application program originally intended for execution on a single processor, the "correct" execution order for the jobs is the one defined by the application program. In another example, the jobs 207 may not all derive from the same application program, but may instead be generated by independently executing programs/events external to the system 101. In such a case, it may not matter whether one job 207 executes before or after another. Nonetheless, if the jobs share a memory space and are run concurrently, intermediate states of one job 207 could be modified by the other, thereby leading to invalid results. Even for completely sequence-independent jobs 207, although the order of access to a particular set of variables may not matter, such set of variables might require "atomic" access by each job 207 (i.e., access that permits some combination of read and write commands to operate without interruption by another process). Thus, a "correct" execution order can be defined for these jobs as well. For example, the "correct" execution order could be defined as the order in which the jobs are presented to the system 101 for execution (i.e., first-in-first-out, or FIFO).

Turning now to the flow chart of FIG. 3, the jobs may be considered to be queued up in their "correct" execution order. In the exemplary embodiment, the queue may not only hold jobs 207 awaiting assignment to a processor 103, but may also hold jobs 207 that have already been launched for execution on one of the processors 103, but which have not yet been retired. (Retirement of a job 207 occurs after the job 207 has completed its execution without "colliding" with any earlier job 207.) Thus, when one of the processors 103 becomes available (due to completion and retirement of an earlier job 207), the unlaunched job 207 closest to the head of the queue is started (step 301). The newly launched job 207 may remain in the queue until it has been retired.

So long as other earlier jobs 207 are running in other processors 103, each newly launched job 207 is run speculatively. That is, it is executed in the processor 103 in a way that, in addition to generating a changed memory state, also preserves the original state of the shared memory space (step 303). As used here, the term "original" means that memory state in existence at the time when the job 207 was first launched. As will be seen, it is necessary to maintain the ability to undo any memory state changes in the event that a collision is detected between the present job 207 and one having an earlier place in the queue. This can be accomplished in several ways.

In a first technique, called "non-privatization", all of the speculative job's reads and writes are directed to the right places in the shared memory space. Prior to performing any write, however, the old value stored at the targeted memory address is copied to a history log. This prepares the system 101 for a roll-back of the state (i.e., copying all of the old values from the history log back to their original places in the shared memory space) in case the speculation fails. For those cases in which the speculation succeeds, this history log is simply flushed, thereby preserving the changes in the shared memory space.

In an alternative technique, called "privatization", the speculative job 207 does not write to the shared memory space, but instead directs all of its write operations to its own private memory area—no other job 207 shares this memory space. If the speculative execution succeeds, then the job 207 becomes nonspeculative, and the writes to the private memory area may be copied to the correct place in the shared memory space. If, instead, the speculation fails, then the private area is flushed. With this technique, so long as the job 207 is speculative (i.e., so long as there is still an earlier job 207 running concurrently), all reads performed by the speculative job 207 must include a check in the private area to determine whether there is an updated value that should be used. If not, then the read is directed to the original location in the shared memory.

Each of the above techniques can be implemented by using standard paging techniques as supported by the MMUs 119 found in most microprocessors. More particularly, memory mapping techniques are applied to create pages for holding speculative data separate and apart from the pages that comprise the shared memory space. In addition to doing away with a requirement for specialized hardware to support the maintenance of speculative states, these techniques can eliminate much of the overhead associated with copying data, as will be seen below. Techniques that employ standard paging mechanisms for maintaining the ability do undo state changes resulting from speculative execution of a job 207 are described in U.S. patent application Ser. No. 09/438,325, filed on even date herewith in the name of P. Holmberg and entitled "Maintenance of Speculative State of Parallel Executed Jobs in an Information Processing System", which is hereby incorporated herein by reference in its entirety.

Continuing with the discussion of FIG. 3, at some point the job 207 will finish to completion ("YES" path out of decision block 305). It must now be determined whether the job 207 may be retired. This involves determining whether all earlier jobs have been retired (decision block 307), such as by detecting that the now completed job 207 is at the head of the queue. If at least one earlier job 207 has not yet completed, then the present job 207 must still be considered speculative, since its own generated state may not be correct due to one or more collisions with the state(s) of the earlier job(s) 207. As a speculative job 207, the present job 207 cannot be retired. Thus, it must continue to wait ("NO" path out of decision block 307).

At some point, it is determined that all earlier jobs have been retired ("YES" path out of decision block 307). At this point, the present job 207 can be considered a "committed" job—its generated memory state is considered correct, and will be used as an "original" memory state for later jobs. Prior to retiring the present job 207, which includes removing it from the queue, a determination is made regarding whether any collisions occurred with later jobs, or whether there is the possibility of collisions with later jobs (decision block 309). A collision has occurred when a still speculative job has read a memory location that was subsequently modified by the now "committed" job. According to the "correct" job ordering, the speculative job should have obtained the modified value. However, due to speculative execution, the speculative job's memory access occurred at an earlier time, and hence picked up the wrong value.

If a collision is detected ("YES" path out of decision block 309), then the speculative job or jobs 207 associated with the collision(s) must have their speculatively generated states flushed, and the jobs restarted (step 311). In connection with this possibility, the entry point 313 in FIG. 3 indicates the occurrence of the present job 207 being restarted due to a collision with an earlier job 207 (i.e., the earlier job 207, itself executing step 311, would have caused the present job 207 to undo any generated state changes and to start over from the beginning).

Restarts may be implemented in any of a number of ways. In many systems, a process state is usually kept in a process control block (PCB). When the process (job) is scheduled for execution, the contents are copied into processor registers. So long as the PCB is not deliberately changed, the original will be there for a restart. In other types of systems, PCBs are not used. Instead, the start condition is fully defined by a job start signal. This is the case, for example, in the AXE system, commercially available from Telefonaktiebolaget LM Ericsson in Stockholm, Sweden. A start signal may be generated within the system, or it may be externally generated and received from a remote processor. In these types of systems, job restart is made possible by leaving the job signal intact until the job becomes non-speculative (i.e., after it has been granted commit priority).

After restarting the later job(s) 207 associated with the collision(s), or if no collisions had occurred ("NO" path out of decision block 309), the present job 207 can be retired. This means taking whatever actions are necessary to cause the speculatively determined state to be included as part of the shared memory space, and to remove the job 207 from the queue of jobs. It should be noted that the strategy of maintaining the resulting state generated by the present job 207, and then retiring the present job 207, can only be performed if that state is correct. This is the case for embodiments that employ a "privatization" strategy. In other cases (e.g., in a "non-privatization" strategy), the state of the present job 207 may also have to be flushed, and the present job restarted. This latter approach may also be employed along with a "privatization" strategy, although it is not as efficient as that depicted in FIG. 3.

The discussion will now focus on techniques for detecting collisions between concurrently executed jobs 207, as called for in decision block 309. Unless specified otherwise, the following strategies assume that a privatization approach is being used for maintaining the speculative states of the concurrently executed jobs 207.

Checking for the occurrence of collisions involves a certain level of overhead, and can be performed in any of a number of known ways. Of course, a mechanism can be employed to determine, in fact, whether a collision occurred at a particular memory location. One technique involves associating a vector of bits (referred to herein as a "marker field") with each memory location for which dependency checking is to be made. The marker field may be stored in the system memory 107 along with the shared data. In some embodiments, each marker field has at least as many bits as there can be concurrently executed jobs 207 in the system 101. Alternatively, it is also possible to assign bits on a "per processor" basis, so that the number of bits in the marker field corresponds to the number of processors 103 in the system 101. In this discussion, we focus on embodiments that use the "per job" approach. However, the inventive techniques discussed herein may equally be applied to those embodiments that employ the "per processor" approach.

Each bit in the marker field is associated with one of the concurrently executed jobs, and the bits are ordered in correspondence with the level of speculation associated with the corresponding job 207—at one end of the marker field, the bit is associated with the earliest running job 207, and at the other end the bit is associated with the latest of the running jobs 207. When a job performs a read to a location, its corresponding bit in the corresponding marker field is set. Whenever a job 207 performs a write, it checks to see whether any of the "read bits" for later jobs are set. If so, each of those jobs has used the wrong data, and is therefore flushed and restarted. In order to guarantee collision detection without permitting cycle level racing to interfere in the process, it is important to follow the sequence of first setting an "own" bit in the marker field, followed by reading the entire marker field to check for collisions.

Along with bits indicating a "read" operation, the marker field might also include "write" bits, one for each of the possible concurrently executed jobs. In this case, before accessing a data item from the common memory, every job 207 sets the appropriate "own bit" (depending on whether the access is a "read" or a "write"), and checks whether any other job 207 has set its bit. This extra information may be useful in some embodiments to determine exactly what action to take in case of a collision. For example, if a "non-privatization" strategy is being employed, a job 207 intending to read from a particular memory location would have to restart itself as well as later jobs if it found that a later job had already written to that same location. By contrast, this would not be necessary if the later jobs had only read from that same location.

Figure 4A:
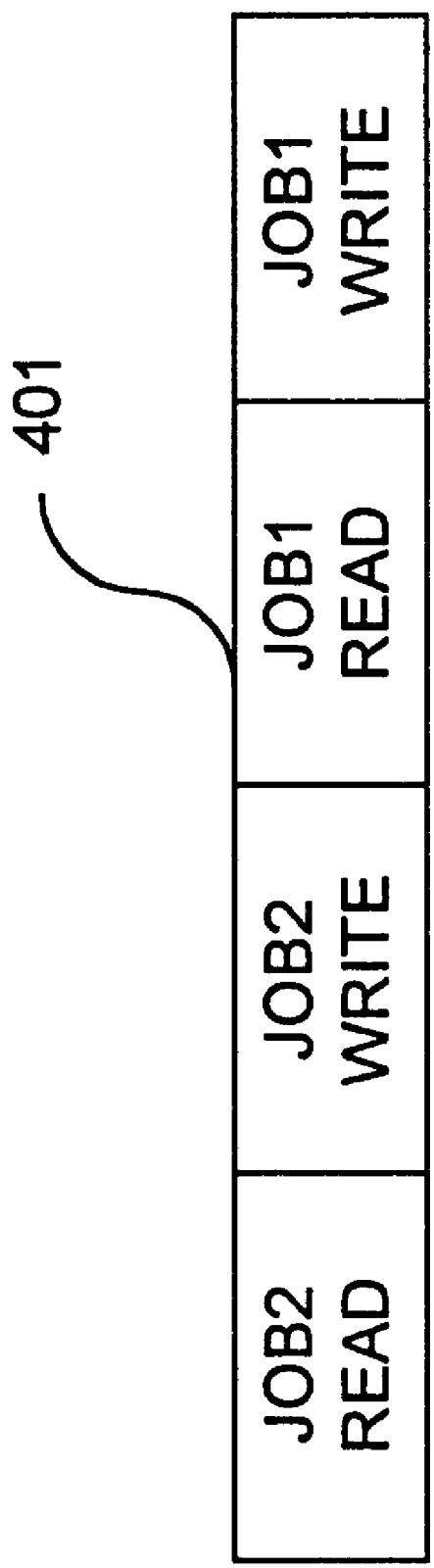
FIGS. 4a–4c illustrate a conventional approach of associating a marker field with each and every variable in the shared memory for a two processor system.
Figure 4B:
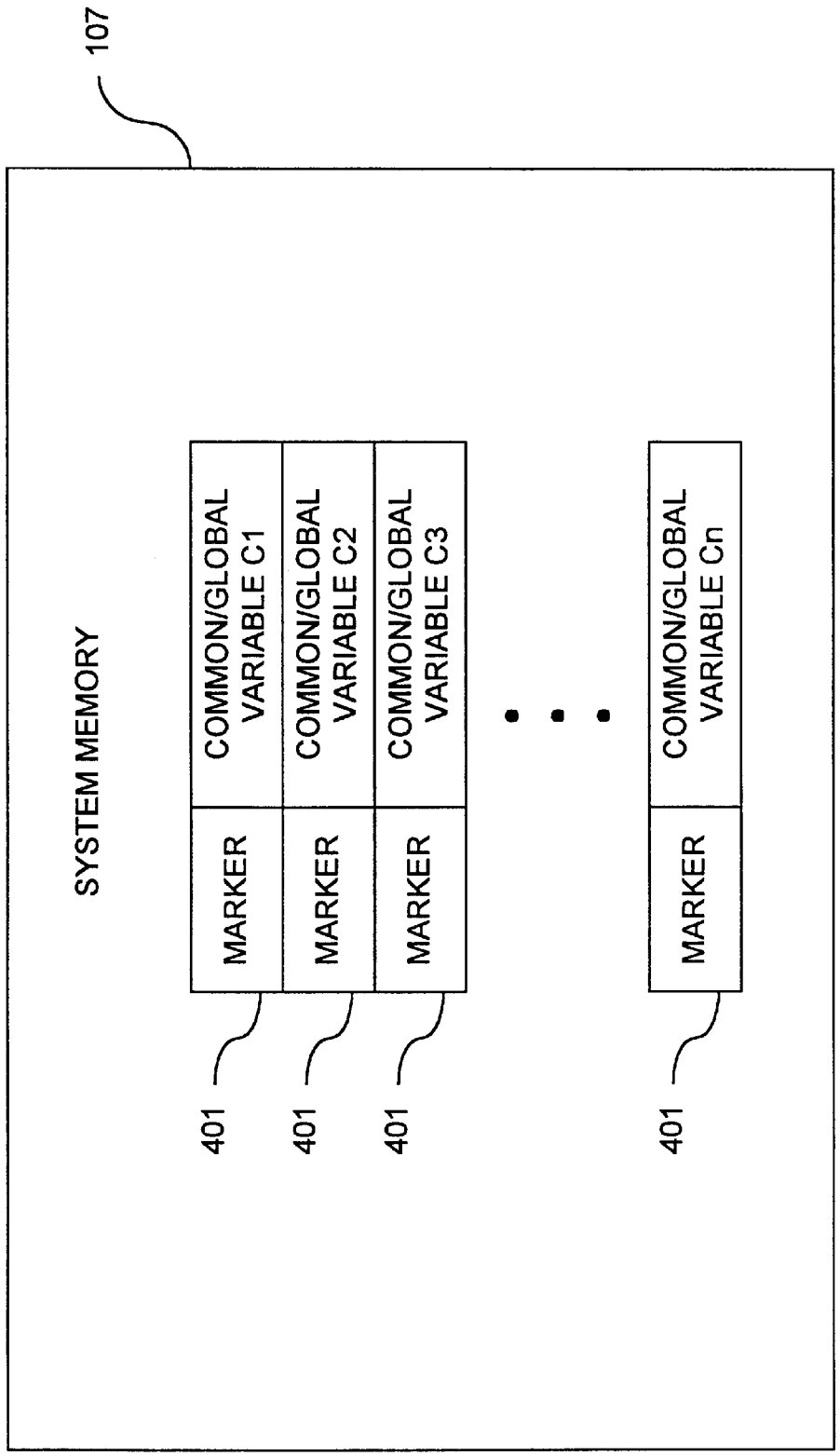
Figure 4C:
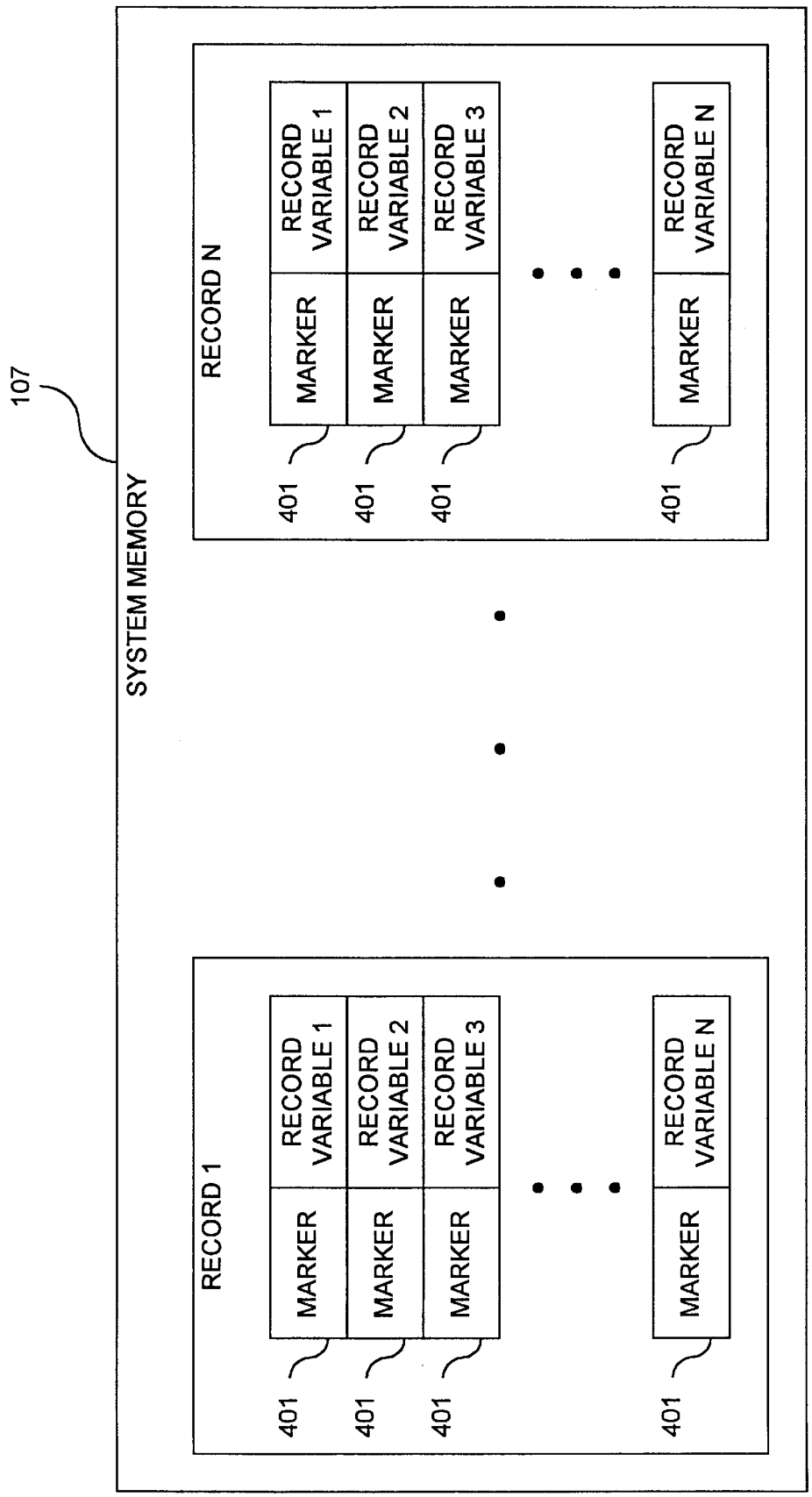

FIGS. 4a–4c illustrate this conventional approach of associating a marker field with each and every variable in the shared memory for a two processor system (which runs at least two jobs 207 concurrently, and possibly more speculatively, depending on the capacity of the marker fields). More particularly, FIG. 4a illustrates the exemplary marker field 401. It can be seen that there are four bits in the marker field 401: two bits for respectively indicating read and write operations performed by a first processor ("JOB1"), and another two bits for respectively indicating read and write operations performed by a second processor ("JOB2"). Of course, the use of single bits for storing the indicated information is merely for purposes of illustration. In alternative embodiments, these may instead be subfields, each comprising more than a single bit for storing the indicated information.

FIG. 4b shows that with the conventional approach, it is necessary to associate a marker field 401 with each and every common or global variable to be used by the concurrently executed jobs 207. As shown in FIG. 4c, it can further be seen that a marker field 401 is also associated with each and every variable within each and every record (RECORD 1 . . . RECORD N).

Figure 5:
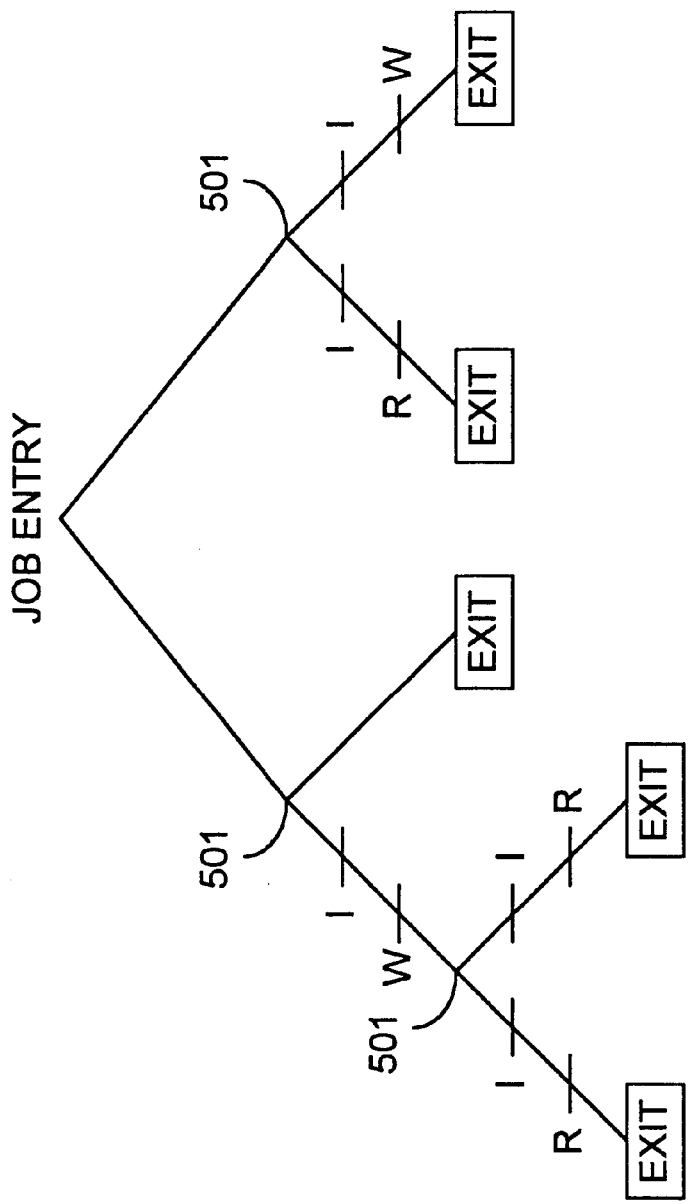
FIG. 5 illustrates the resulting execution tree associated with prior art execution of a job.

FIG. 5 illustrates the resulting execution tree associated with prior art execution of a job 207. In the figure, the exemplary job 207 is depicted as having a number of branch points 501. Within each branch of the execution path, memory write operations are flagged by a "W", and memory read operations are flagged by an "R". Prior to every one of the read and write operations, it is necessary to insert code (designated by "I") to perform the marker field manipulation described above (i.e., to set the job's "own" read or write bit and then to read back the entire marker field to see whether any other processor has set its bit). In compiled implementations, this code can be inserted during compilation of the job, or for already existing object codes, by means of a post-processor operating on object code. In interpreted environments, the code is executed at run time by the interpreter whenever a read or write operation is encountered in the source code.

It can be seen that this collision detection technique comes at the expense of quite a bit of overhead, since not only must the address of every memory access be compared between the two jobs, but also the order of the speculative job's reads relative to the last write of the committed job must be determined.

Rather than incurring this level of overhead, it is possible to make a tradeoff between the amount of overhead required and the level of certainty that can be obtained regarding whether a collision did, in fact, occur. In accordance with one aspect of the invention, the structure of the data is exploited by associating a marker field with a data area that is larger than an individually addressable variable/data item. As mentioned earlier, the structure may be physical (e.g., a page managed by the memory management unit), logical (e.g., records, objects, files, tables) and/or a combination of the two. This can substantially reduce the amount of overhead associated with manipulation of marker fields, with the exact amount being a function of how many individual variables/data items are included within one data area. For example, reducing the overhead by a factor of 10 is not unreasonable, since this only requires that each data area be associated with 10 individual variables/data items that would typically be accessed by a job.

In general, the larger the size of the data area, the smaller the amount of run-time overhead associated with accessing and manipulating the associated marker fields. However, the larger the size of the data area, the higher the probability of collisions, since two jobs accessing different variables located within the same data area will nonetheless cause a collision to be detected. Although this increases the probability of needlessly discarding ("flushing") the speculatively generated state and re-running the speculative job, this probability can be kept to a low enough level that the advantages of reduced overhead outweigh the disadvantages. In particular, it is preferable to select the size of the data area so as to optimize the performance, keeping in mind the fact that reducing marker field manipulation overhead may increase the probability of collisions (which results in overhead associated with flushing one or more jobs 207). It is also preferable to partition the memory into data areas in a way that exploits the flow of execution. For example, in records/objects/structures associated with transactions, if one job belonging to a particular transaction accesses a particular record/object/structure, the probability of another job belonging to some other transaction accessing the same record/object/structure (during the same time frame, e.g., a period of concurrent execution of the two jobs) is very low (i.e., below a predetermined probability level that is determined to be acceptable for the particular application).

It should be noted that there is no requirement that the same size data area be used for the entire system. For object oriented designs, associating a marker field with every common/global/public variable and associating a marker field with record/table/private data as a whole will typically yield optimum performance. This is because most of the accesses during a job 207 are to record/private variables. When one event is using a given record there is only a very small probability that some other event executing at the same time will try to access the same record. The effect of this distribution of marker fields is that the number of collisions/rollbacks is kept to almost the same level as it would be in a system that associates a marker field with every variable, while the run-time overhead associated with accessing and manipulating the marker fields can even be cut by 90%.

Figure 6:
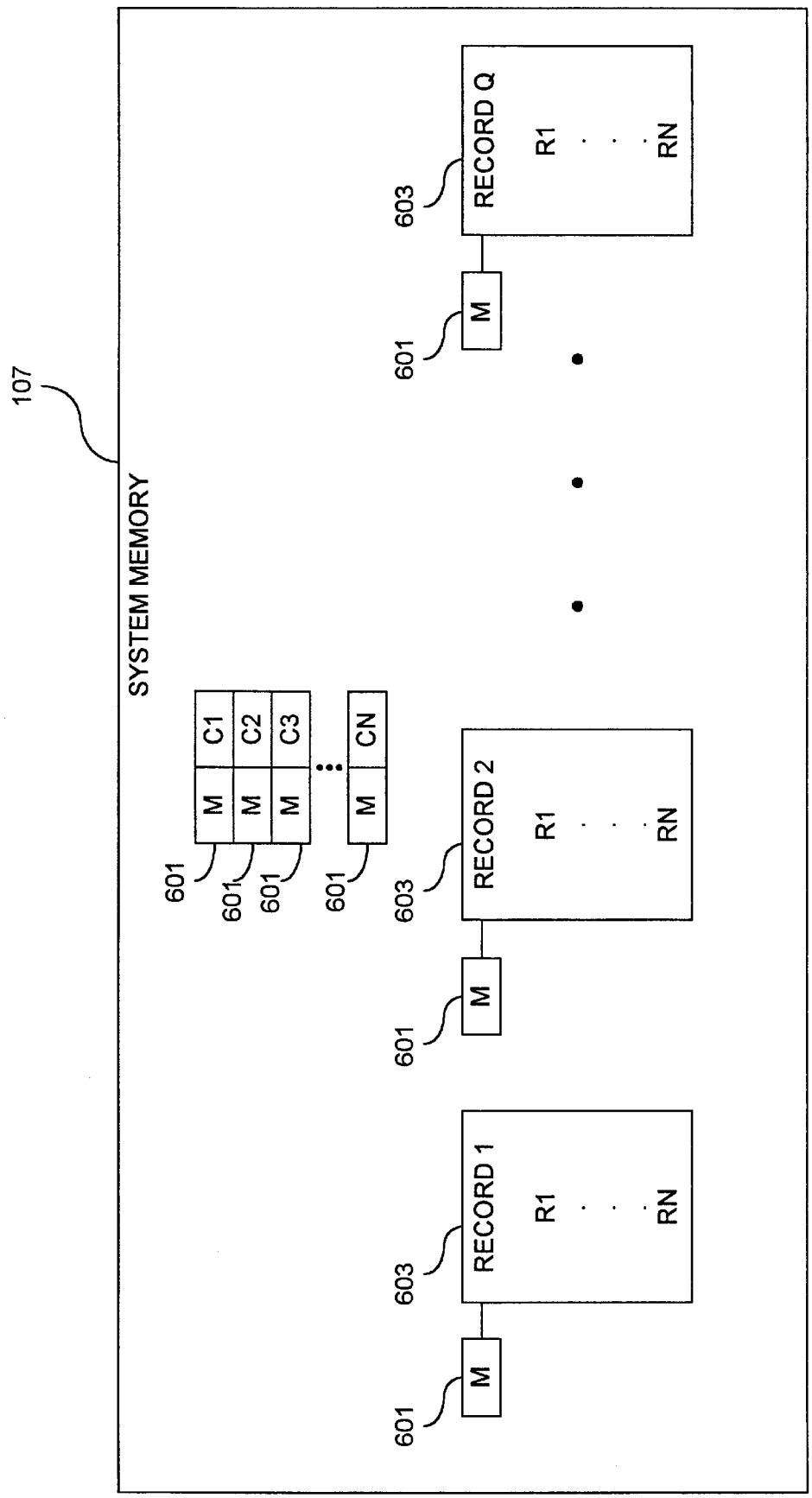
FIG. 6 is a block diagram of an exemplary marker field distribution in accordance with one aspect of the invention.

FIG. 6 is a block diagram of an exemplary marker field distribution in accordance with one aspect of the invention. In this example, each common/global data item/variable (C1, C2, C3, . . . CN) has a marker field (M) 601 associated with it. However, every record variable (R1, . . . , RN) does not have a uniquely associated marker field 601. Instead, the entire record 603 is associated with only a single marker field 601.

Figure 7:
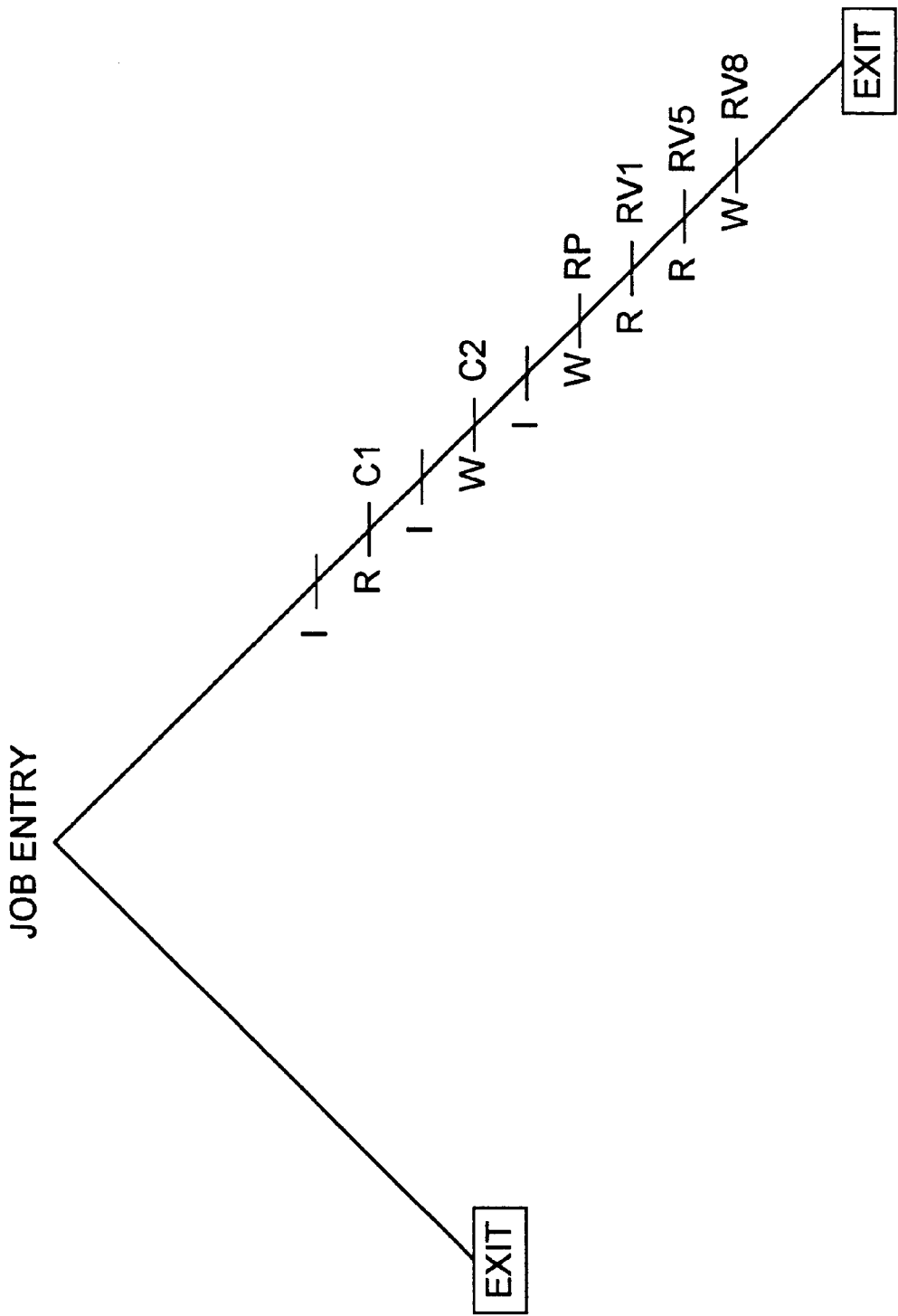
FIG. 7 is an exemplary execution tree of a job in accordance with one aspect of the invention.

FIG. 7 is an exemplary execution tree of a job 207 in accordance with one aspect of the invention. In the figure, inserted marker code is represented by "I", read operations are represented by "R", write operations are represented by "W", "C1" and "C2" represent global variables, "RP" represents a record pointer, and "RV1", "RV5" and "RV8" represent record variables. It can be seen that, instead of inserting marker manipulation code before each and every variable, it is inserted only before each common/global variable access, and before a change/load of the record pointer ("RP") in each and every entry to exit legs. A great deal of runtime overhead is avoided because marker manipulation code is not inserted before any access to record variables.

As an alternative to inserting marker field manipulation code into appropriate places of each job 207 (or alternatively inserting software trap instructions at these locations, where the trap handler is marker field manipulation code), some embodiments utilize the MMUs 119 to assist with this work. In these embodiments, collision detection is done on a "per page" basis. That is, if two jobs 207 access the same shared virtual page in memory, they are considered to have collided.

Figure 8:
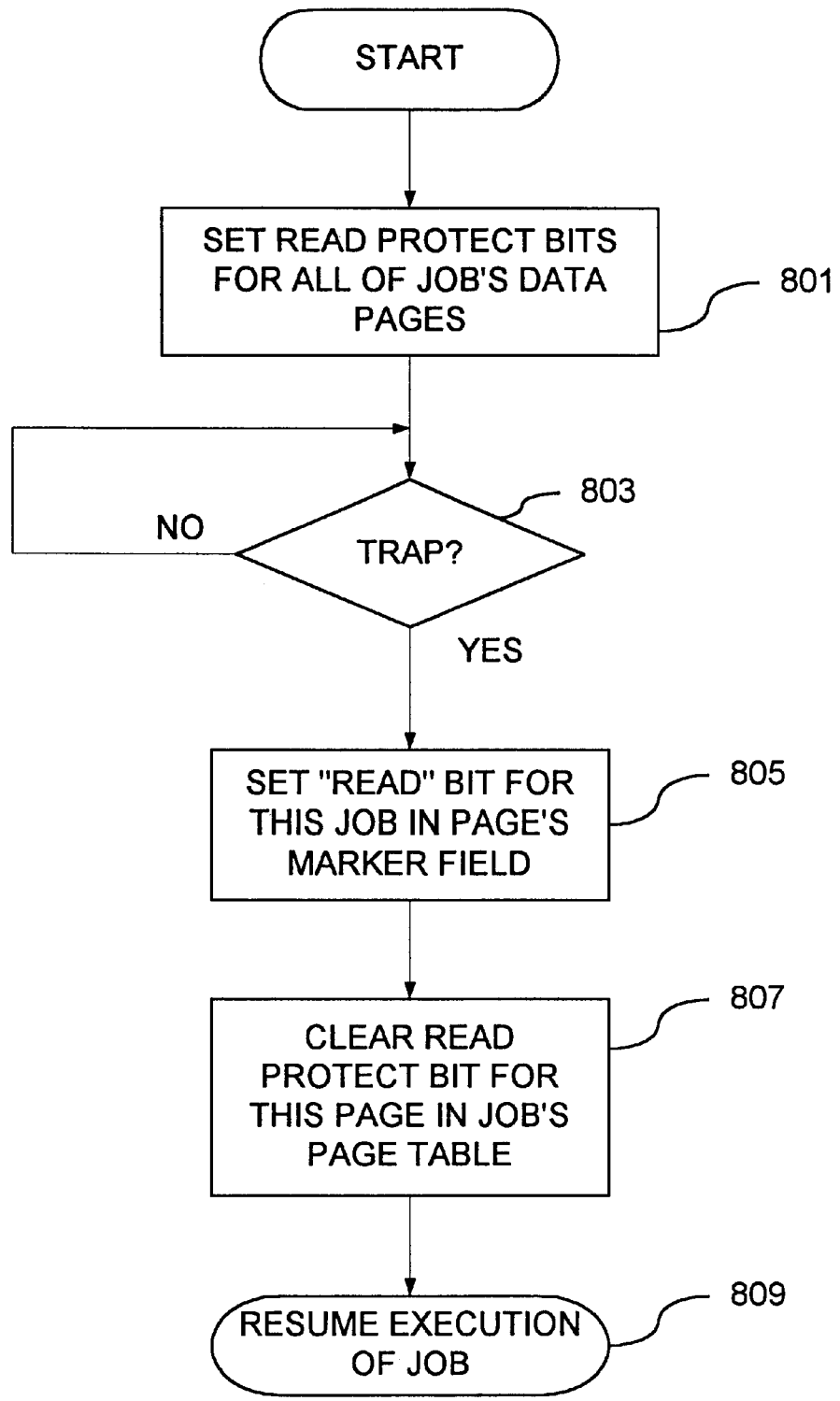
FIG. 8 is a flow chart of an exemplary collision detection strategy in accordance with an aspect of the invention.

To more efficiently implement such a strategy, an underlying principle is that if a job 207 reads from a page, then it is presumed that it will also write to that same page. Consequently, it becomes unnecessary to actually detect a job's write operations; it is sufficient merely to detect when a read occurs. FIG. 8 is a flow chart of an exemplary collision detection strategy.

When a job 207 is first started, the read protect bits for all of its data pages are set in the job's page table (step 801). The job then begins execution. When a first read occurs, it will cause a trap ("YES" path out of decision block 803). The trap handler then manipulates that page's marker field to indicate the fact that this job 207 has read the page (step 805). The marker field may be associated with the page table for shared pages, since this page table will be accessed both when creating a private page and also when committing the job 207.

Next, in order to reduce overhead associated with marker field manipulation, the read protect bit for this page is reset in the job's page table (step 807), so that future accesses to the same page by the same job 207 will not cause any additional traps. The trap handler then exits, thereby permitting the job 207 to resume its execution (step 809).

With this strategy, dependency checking can be performed when the job's speculative state is ready to be committed (i.e., when it is determined that there was no collision between a present job 207 and an earlier job 207, so that the present job's speculative state can become part of the "official" state of the shared memory). When the speculative page is mapped to become the official one, a check is also made to determine whether any later speculative job 207 has also read that page. If so, then those later jobs must be flushed and restarted.

There is an overhead associated with setting memory protection bits, taking traps on a first read of a page and restoring the memory protection bits. In order to further reduce this overhead, additional optimizations can be made. An advantageous strategy for determining a suitable level of granularity for dependency checking in a PLEX program is:

Per individual global variable.

Per index value. (PLEX supports two-dimensional arrays that are indexed by means of a "pointer" and an "index". In this case, the "pointer" would be the basis for dependency checking.)

On each record for dynamic data structures.

This strategy uses a mix of coarse grained and individual address dependency checking, and also uses different schemes depending on variable type.

In another class of embodiments, no attempt is made to detect when data is changed, or even accessed. Instead, the system is arranged to detect whenever a code segment is entered that might change that data.

In these embodiments, the code for dependency detection is inserted into the call and return routines. Thus, for example, in a PLEX environment one would insert the dependency detection software in the signal-sending and end-program routines. Similarly, in an object oriented programming environment, the dependency detection software would be made a part of the routines for calling a method and for returning.

With the dependency detection software arranged in this manner, the read bit is set for a program block (i.e., a predefined part of a job 207, such as a method) whenever that block is entered. This is done under the assumption that the program block will perform a read of at least one data item. If the speculative data is stored on a per page basis, as described in U.S. patent application Ser. No. 09/438,325, filed on even date herewith in the name of P. Holmberg and entitled "Maintenance of Speculative State of Parallel Executed Jobs in an Information Processing System", then the read bit in the marker field can be set for each individual page that the routine may read.

In these embodiments, checks are performed when committing the speculative data to the shared memory space. When a speculative page is mapped so that it will become part of the shared memory space, an additional check is made to determine whether any later speculative task has also read the page. If so, a collision is detected and the later jobs should be flushed and restarted.

To summarize these embodiments that consider a page to have been accessed whenever a program block is executed that may access the page, the strategy adopted includes:

1) Allocating the data area belonging to each program block in such a way that it starts on page boundaries. This guarantees that no page will hold data belonging to two blocks.
2) Providing one vector comprising read bits (or subfields) associated with each program block, wherein one read bit (or subfield) is provided for each of the concurrently executed programs.
3) Setting the read bit (or subfield) associated with a particular program block whenever that block is entered for program execution. This operation is performed under the assumption that if a program block is entered, it will perform at least one read to a page contained within the program block. It should be noted that one job can enter more than one program block.
4) Clearing the read bit (or subfield) when the job is committed (i.e, retired).
5) Upon completion of a job, checking whether any read bit (or subfield) associated with a later job is set (i.e., after the completed job has both updated the shared state and performed its last write). If any such read bits (or subfields) are found to be set, the corresponding jobs are flushed and restarted.

In yet other embodiments, an additional optimization of this dependency checking strategy is performed whereby, when a speculative job enters a block, a check is made to determine whether any earlier job has set its corresponding read bit (or subfield). If so, the speculative job is caused to stall, rather than continue its execution, because it is guaranteed to be flushed and restarted anyway. The earlier job that has set the read bit (or subfield) will do the flush when it retires.

Existing software represents a large investment in many industries. Very often, this existing software is not designed to be broken up into jobs for coarse-grained concurrent execution on a multi-processor system. By means of the above-described techniques, such legacy software can continue to be used when a necessary performance gain requires a change of computer architecture. Existing sequentially programmed software does not have to be scrapped and rewritten. To a large extent, such software need not even be modified, but instead can be easily migrated to a multi-processor computer as is. Furthermore, dedicated hardware support does not have to be implemented to run this software, because software techniques with or without memory management that is standard on most processors can be used to support the special needs of speculative execution.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a computer system comprising the steps of:

defining a first job having a set of shared individually addressable data items stored in a corresponding set of locations within a memory;

defining a second job having the set of shared individually addressable data items stored in the corresponding set of locations within the memory;

partitioning the set of locations into a set of data areas, wherein at least one of the data areas stores more than one of the data items;

creating a set of marker fields, each uniquely associated with a corresponding one of the data areas;

for each of the data areas, setting a first subfield in the associated marker field in response to the first lob accessing any of the data stored within the data area;

for each of the data areas, setting a second subfield in the associated marker field in response to the second job accessing any of the data stored within the data area;

running the first job and the second job; and determining whether a collision has occurred between the first job and the second job by determining whether the first job accessed a same data area that was accessed by the second job, said determining step including determining whether there exists a marker field having both the first subfield and the second subfield set, wherein, it is determined that a collision has occurred without determining whether a particular data item within the same data area was accessed by both the first job and the second job.

2. The method of claim 1, wherein the step of determining whether a collision has occurred between the first job and the second job comprises:

determining that the first job is attempting to access one of the data items stored in a first data area; and determining whether the second subfield in the marker field associated with the first data area is set.

3. The method of claim 1, wherein the step of, for each of the data areas, setting the first subfield in the associated marker field in response to the first job accessing any of the data stored within the data area is performed only in response to the first time the first job accesses any of the data stored within the data area.

4. The method of claim 1, wherein the step of, for each of the data areas, setting the first subfield in the associated marker field is performed in response to a software trap instruction that is executed just prior to another program instruction that causes the first job to access one of the data items stored within the data area.

5. The method of claim 1, wherein the step of, for each of the data areas, setting the first subfield in the associated marker field is performed in response to a first memory protect interrupt caused by the first job accessing any of the data items stored within the data area.

6. The method of claim 5, further comprising:

resetting a memory protect bit associated with the first job and the data area after the first memory protect interrupt.

7. The method of claim 1, wherein:

at least one of the data areas is associated with a program block; and for said at least one of the data areas, setting the first subfield in the associated marker field is performed in response to initiating program execution in the program block.

8. The method of claim 1, wherein at least one of the data areas is a page of the memory.

9. The method of claim 1, wherein at least one of the data areas is a data record defined by the first job and the second job, wherein the data record comprises a plurality of record variables.

10. The method of claim 1, wherein at least one of the data areas is an object defined by the first job and the second job, and wherein the object comprises more than one individually addressable data item.

11. The method of claim 1, wherein:

the first job and the second job are created by an object oriented programming language; and at least one of the data areas is a portion of the memory containing a method that is part of the first job and the second job.

12. The method of claim 1, wherein the step of determining whether the collision has occurred between the first job and the second job comprises determining whether the first job read from the same data area as was accessed by the second job, regardless of whether the same data item within the same data area was accessed by both the first job and the second job.

13. The method of claim 1, wherein the step of determining whether the collision has occurred between the first job and the second job comprises determining whether the first job wrote to the same data area as was accessed by the second job, regardless of whether the same data item within the same data area was accessed by both the first job and the second job.

14. The method of claim 1, wherein the step of partitioning the set of locations into the set of data areas comprises defining said at least one of the data areas such that it stores a number, n, of data items, where n is greater than 1, and wherein n is selected in a way such that if the first job accesses said at least one of the data areas, then a probability of said second job also accessing said at least one of the data areas during a time of concurrent execution of said first and second jobs is lower than a predetermined probability level.

15. The method of claim 1, wherein at least a second one of the data areas stores only one of the individually addressable data items.

16. An apparatus for operating a computer system comprising:

logic configured to define a first job having a set of shared individually addressable data items stored in a corresponding set of locations within a memory;

logic configured to define a second job having the set of shared individually addressable data items stored in the corresponding set of locations within the memory;

logic configured to partition the set of locations into a set of data areas, wherein at least one of the data areas stores more than one of the data items;

logic configured to create a set of marker fields, each uniquely associated with a corresponding one of the data areas;

logic configured to set, for each of the data areas, a first subfield in the associated marker field in response to the first job accessing any of the data stored within the data area;

logic configured to set, for each of the data areas, a second subfield in the associated marker field in response to the second job accessing any of the data stored within the data area;

logic configured to run the first job and the second job; and logic configured to determine whether a collision has occurred between the first job and the second job by determining whether the first job accessed a same data area that was accessed by the second job, said collision-determining logic including logic that determines whether there exists a marker field having both the first subfield and the second subfield set, wherein, it is determined that a collision has occurred without determining whether a particular data item within the same data area was accessed by both the first job and the second job.

17. The apparatus of claim 16, wherein the logic configured to determine whether a collision has occurred between the first job and the second job comprises:

logic configured to determine that the first job is attempting to access one of the data items stored in a first data area; and logic configured to determine whether the second subfield in the marker field associated with the first data area is set.

18. The apparatus of claim 16, wherein the logic configured to set, for each of the data areas, a first subfield in the associated marker field in response to the first job accessing any of the data stored within the data area operates only in response to the first time the first job accesses any of the data stored within the data area.

19. The apparatus of claim 16, wherein the logic configured to set, for each of the data areas, the first subfield in the associated marker field operates in response to a software trap instruction that is executed just prior to another program instruction that causes the first job to access one of the data items stored within the data area.

20. The apparatus of claim 16, wherein the logic configured to set, for each of the data areas, the first subfield in the associated marker field operates in response to a first memory protect interrupt caused by the first job accessing any of the data items stored within the data area.

21. The apparatus of claim 20, further comprising:

logic configured to reset a memory protect bit associated with the first job and the data area after the first memory protect interrupt.

22. The apparatus of claim 16, wherein:

at least one of the data areas is associated with a program block; and for said at least one of the data areas, the logic configured to set the first subfield in the associated marker field operates in response to initiating program execution in the program block.

23. The apparatus of claim 16, wherein at least one of the data areas is a page of the memory.

24. The apparatus of claim 16, wherein at least one of the data areas is a data record defined by the first job and the second job, wherein the data record comprises a plurality of record variables.

25. The apparatus of claim 16, wherein at least one of the data areas is an object defined by the first and second jobs, and wherein the object comprises more than one individually addressable data item.

26. The apparatus of claim 16, wherein:
the first job and the second job are created by an object oriented programming language; and
at least one of the data areas is a portion of the memory containing a method that is part of the first job and the second job.

27. The apparatus of claim 16, wherein the logic configured to determine whether the collision has occurred between the first job and the second job comprises logic configured to determine whether the first job read from the same data area as was accessed by the second job, regardless of whether the same data item within the same data area was accessed by both the first job and the second job.

28. The apparatus of claim 16, wherein the logic configured to determine whether the collision has occurred between the first job and the second job comprises logic configured to determine whether the first job wrote to the same data area as was accessed by the second job, regardless of whether the same data item within the same data area was accessed by both the first job and the second job.

29. The apparatus of claim 16, wherein the logic configured to partition the set of locations into the set of data areas comprises logic configured to define said at least one of the data areas such that it stores a number, n, of data items, where n is greater than 1, and wherein n is selected in a way such that if the first job accesses said at least one of the data areas, then a probability of said second job also accessing said at least one of the data areas during a time of concurrent execution of said first and second jobs is lower than a predetermined probability level.

30. The apparatus of claim 16, wherein at least a second one of the data areas stores only one of the individually addressable data items.

* * * * *